(No Model.)
J. J. WILHELM.
CALK PLATE FOR HORSESHOES.
No. 351,013. Patented Oct. 19, 1886.
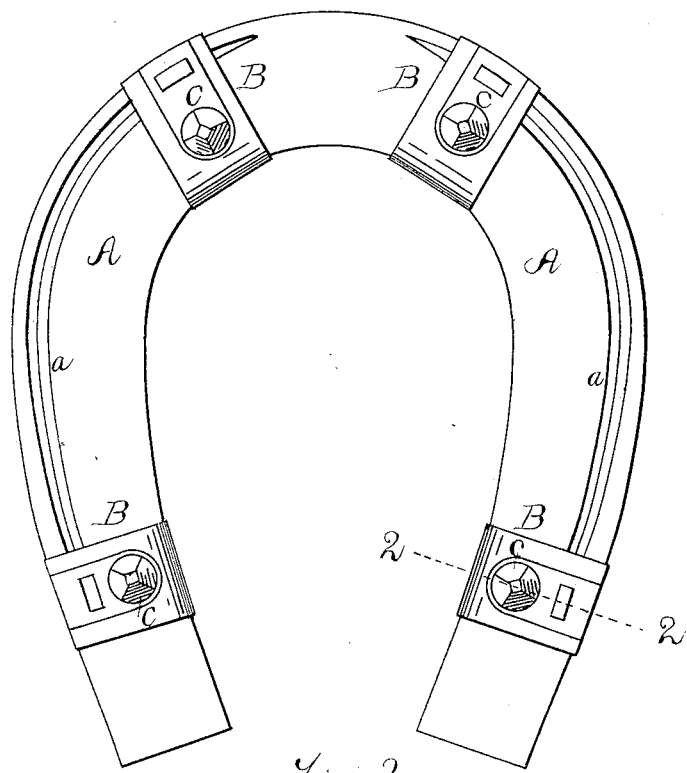
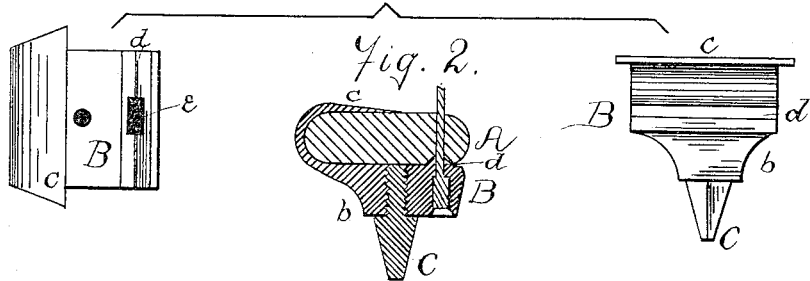
Witnesses
Inventor
John J. Wilhelm,
By his Attorneys
Soulé and Co.

# UNITED STATES PATENT OFFICE.

JOHN J. WILHELM, OF CEDAR GROVE, INDIANA.

CALK-PLATE FOR HORSESHOES.

SPECIFICATION forming part of Letters Patent No. 351,013, dated October 19, 1886.

Application filed July 15, 1886. Serial No. 208,113. (No model.)

*To all whom it may concern:*

Be it known that I, JOHN J. WILHELM, a citizen of the United States, residing at Cedar Grove, in the county of Franklin and State of Indiana, have invented certain new and useful Improvements in Calk-Plates for Horseshoes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention consists in an improved construction of removable calk-plates for horseshoes carrying removable calks, as is hereinafter more particularly described and claimed.

In the accompanying drawings, Figure 1 is a bottom view of a horseshoe provided with my improved calk-plates. Fig. 2 is a vertical cross-section in a plane indicated by the line 2 2 in Fig. 1, and Fig. 3 shows details of the calk-plate.

A is a horseshoe of ordinary construction, having the usual nail-creases, $a$, on the bottom side, and B is one of the removable calk-plates. As many of these calk-plates may be secured to the shoe as may be deemed necessary, four—the number shown—being a proper and usual number. Each calk plate is composed of a bottom piece, $b$, which fits under the bottom surface of the shoe, and of an upwardly-extending overhanging lip, $c$, which fits over and rests upon the upper surface of the shoe. The bottom piece, $b$, extends nearly the entire width of the shoe, and has a ridge, $d$, on the outer edge, which fits in the nail-crease $a$. A nail-hole, $e$, is formed in the bottom piece, extending also through the ridge $d$, through which one of the nails is driven to hold the calk-plate on the shoe. The lip $c$ fits around the inner edge of the shoe, but does not extend over the upper surface of the shoe as far as the nail-holes. To this calk-plate a calk, C, is removably secured. The calk may be secured by any desired means or construction. For the purpose of illustration, the calk is shown with a screw-threaded shank which fits in a threaded aperture in the calk-plate. The calk-plate is retained on the shoe by the lip $c$ and ridge $d$, the nail being driven through it merely to prevent endwise and lateral displacement.

These calk-plates may be fitted on any shoe, and be taken from an old worn-out shoe and put on a new one, and when the calks are worn out new ones may be used with the same calk-plates.

I am aware of the patents granted to Whitehead, August 10, 1869, No. 93,654, and to Hubbard, February 18, 1868, No. 74,539, and I do not claim anything shown therein.

I claim as my invention—

A removable calk-plate having a bottom piece formed with a projecting ridge which fits in the bottom nail-crease of the shoe, and with an aperture or nail-hole, whereby the calk-plate can be fastened to the shoe, said calk-plate having also an upwardly-extending overhanging retaining-lip, $c$, in combination with a calk removably secured to said bottom piece, said calk being so secured that it can be removed from the calk-plate without detaching the latter from the shoe, substantially as set forth.

In testimony whereof I affix my signature in presence of two witnesses.

JOHN J. WILHELM.

Witnesses:
SAMUEL S. HARRELL,
WM. K. BRACKEN.